(12) United States Patent
Carranza

(10) Patent No.: US 11,713,153 B1
(45) Date of Patent: Aug. 1, 2023

(54) COLLAPSIBLE BAG HOLDING FRAME ASSEMBLY

(71) Applicant: Henry Carranza, Corpus Christi, TX (US)

(72) Inventor: Henry Carranza, Corpus Christi, TX (US)

( * ) Notice: Subject to any disclaimer, the term of this patent is extended or adjusted under 35 U.S.C. 154(b) by 0 days.

(21) Appl. No.: 17/732,004

(22) Filed: Apr. 28, 2022

(51) Int. Cl.
*B65B 67/12* (2006.01)
*B65F 1/14* (2006.01)
*B60R 9/00* (2006.01)

(52) U.S. Cl.
CPC .......... *B65B 67/1222* (2013.01); *B60R 9/00* (2013.01); *B65B 67/1205* (2013.01); *B65F 1/1415* (2013.01)

(58) Field of Classification Search
CPC ... B65B 67/1222; B65B 67/1205; B60R 9/00; B65F 1/1415
USPC ............... 224/482, 546; 108/42, 44, 46, 47; 248/95, 97, 99
See application file for complete search history.

(56) References Cited

U.S. PATENT DOCUMENTS

| | | | | |
|---|---|---|---|---|
| 490,578 A * | 1/1893 | Merry | ..................... | B65B 67/12 248/99 |
| 2,235,182 A * | 3/1941 | Weston | ............... | B65B 67/1255 248/100 |
| 2,805,704 A * | 9/1957 | Avseev | .................... | A47D 7/04 297/255 |
| 3,037,639 A * | 6/1962 | Kost | ...................... | B60N 3/007 224/482 |
| 3,135,970 A * | 6/1964 | Trent | ..................... | A47D 3/005 5/2.1 |
| 3,175,793 A * | 3/1965 | Kennedy | .............. | A61G 7/0503 248/302 |
| 3,335,679 A * | 8/1967 | Bown | .................... | B60N 3/004 D7/552.1 |
| 3,574,872 A * | 4/1971 | Mattila | .................. | A47D 13/02 5/118 |
| 3,735,430 A * | 5/1973 | Platz | ..................... | A47D 9/005 5/118 |
| 4,007,864 A * | 2/1977 | Hreha | ....................... | B60R 9/02 224/571 |
| 4,311,210 A * | 1/1982 | Jackson | .................. | E06C 7/486 182/20 |
| 4,576,350 A * | 3/1986 | Bond | ...................... | B65B 67/12 248/97 |

(Continued)

FOREIGN PATENT DOCUMENTS

DE 102008030744 A1 * 4/2010 ............ B65F 1/1415
GB 2177996 A * 2/1987 ............. B65B 67/12

*Primary Examiner* — Kimberly T Wood

(57) ABSTRACT

A collapsible bag holding frame assembly for holding a trash bag includes a first frame and a second frame. The first frame defines an opening. The second frame is attached to the first frame so that a first piece of the second frame is substantially perpendicular to the first frame. A second piece of the second frame extends from proximate to an upper end of the first piece and opposingly to the first frame. The second piece and the first piece define a notch into which an element of a structure is insertable to removably attached to the structure. The first frame is positioned above a surface from which the structure extends. A bag is insertable in the opening so that an upper segment of the bag is stretchable around and attachable to the first frame.

10 Claims, 7 Drawing Sheets

(56) References Cited

U.S. PATENT DOCUMENTS

| | | | | |
|---|---|---|---|---|
| 4,607,773 | A * | 8/1986 | Mason | B60R 9/02 |
| | | | | 224/571 |
| 4,684,087 | A * | 8/1987 | Spickard | B65B 67/12 |
| | | | | 224/539 |
| 4,850,282 | A * | 7/1989 | Postic | A47B 23/04 |
| | | | | 108/47 |
| 4,893,363 | A * | 1/1990 | Huff | E04H 4/144 |
| | | | | 4/496 |
| 4,942,989 | A * | 7/1990 | Miller | B60R 9/02 |
| | | | | 224/325 |
| 4,944,434 | A * | 7/1990 | Hamilton | B60R 9/02 |
| | | | | 224/571 |
| 5,016,844 | A * | 5/1991 | Garvin | B65B 67/12 |
| | | | | 248/150 |
| D317,742 | S * | 6/1991 | Miller | D8/367 |
| D326,172 | S * | 5/1992 | Biesele | D3/10 |
| 5,127,188 | A * | 7/1992 | Shaw | A47G 7/044 |
| | | | | 47/68 |
| 5,180,126 | A * | 1/1993 | Bennett | B65B 67/12 |
| | | | | D34/5 |
| 5,183,226 | A | 2/1993 | Brooks | |
| 5,263,672 | A | 11/1993 | He | |
| 5,307,527 | A * | 5/1994 | Schober | E04H 4/14 |
| | | | | 297/254 |
| 5,472,164 | A * | 12/1995 | Contee, Jr. | B60R 9/00 |
| | | | | 248/214 |
| 5,492,257 | A * | 2/1996 | Demick | B60R 7/02 |
| | | | | 296/37.16 |
| 5,718,400 | A * | 2/1998 | Dwy | B65B 67/12 |
| | | | | 248/99 |
| 6,076,782 | A * | 6/2000 | Aiderman | B65B 67/1205 |
| | | | | 248/97 |
| D428,544 | S | 7/2000 | Moffitt | |
| 6,164,607 | A * | 12/2000 | Hawkes | B65B 67/12 |
| | | | | 141/391 |
| 6,324,708 | B1 * | 12/2001 | Langley | E04H 4/08 |
| | | | | 211/13.1 |
| 6,382,573 | B1 | 5/2002 | Cepeda | |
| 6,446,919 | B1 | 9/2002 | Tsui | |
| 7,404,531 | B2 | 7/2008 | McConnell | |
| 7,604,143 | B2 * | 10/2009 | Kerekes, Jr. | B65F 1/1415 |
| | | | | 141/369 |
| 8,448,268 | B2 * | 5/2013 | Bradshaw | E04H 4/14 |
| | | | | 211/100 |
| 8,684,323 | B2 | 4/2014 | McConnell | |
| 8,960,477 | B1 * | 2/2015 | Bishop | B63B 17/00 |
| | | | | 224/579 |
| 9,212,497 | B2 * | 12/2015 | Chlapaty | A47C 4/286 |
| D794,895 | S * | 8/2017 | Goodman | D34/6 |
| 9,926,714 | B2 * | 3/2018 | Cusic | E04H 4/14 |
| 10,106,096 | B1 * | 10/2018 | Durham | B60R 9/02 |
| 10,196,202 | B1 * | 2/2019 | Clavizzao | B60N 3/08 |
| 11,490,768 | B1 * | 11/2022 | Ippolito | B65D 81/38 |
| 2002/0027181 | A1 * | 3/2002 | Hatfield | A63B 55/57 |
| | | | | 248/150 |
| 2005/0061929 | A1 * | 3/2005 | Wood | B65F 1/10 |
| | | | | 248/95 |
| 2007/0210217 | A1 * | 9/2007 | McConnell | B65F 1/1415 |
| | | | | 248/99 |
| 2012/0189230 | A1 * | 7/2012 | King | F16B 2/245 |
| | | | | 383/33 |
| 2013/0001377 | A1 * | 1/2013 | Reiss | B65B 67/1205 |
| | | | | 248/97 |
| 2013/0025242 | A1 * | 1/2013 | Cundy | B65B 67/1227 |
| | | | | 248/99 |
| 2013/0333268 | A1 * | 12/2013 | Henry, Jr. | A01K 97/10 |
| | | | | 43/4.5 |
| 2015/0232267 | A1 | 8/2015 | Leach | |
| 2017/0121104 | A1 * | 5/2017 | Degnan | B65F 1/1415 |
| 2021/0061554 | A1 * | 3/2021 | Moore | F16M 13/02 |

* cited by examiner

COLLAPSIBLE BAG HOLDING FRAME ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to holding assemblies and more particularly pertains to a new holding assembly for holding a trash bag. The present invention discloses a holding assembly comprising a first frame, which defines an opening, and a second frame, which is attached to the first frame and which is attachable to an element of a structure. A bag is insertable in the opening so that an upper segment of the bag is stretchable around and attachable to the first frame.

(2) Description of Related Art including information disclosed under 37 CFR 1.97 and 1.98.

The prior art relates to holding assemblies. Prior art holding assemblies comprising collapsible frameworks including lower frames that are positionable on a surface and upper frames for engaging bags are known in the prior art. Prior art holding assemblies also include frames that are attachable to doors and to the handles of t-shirt style bags. What is lacking in the prior art is a holding assembly comprising a first frame, which defines an opening, and a second frame, which is attached to the first frame and which is attachable to an element of a structure. A bag is insertable in the opening so that an upper segment of the bag is stretchable around and attachable to the first frame.

BRIEF SUMMARY OF THE INVENTION

An embodiment of the disclosure meets the needs presented above by generally comprising a first frame and a second frame. The first frame defines an opening. The second frame is attached to the first frame so that a first piece of the second frame is substantially perpendicular to the first frame. A second piece of the second frame extends from proximate to an upper end of the first piece and opposingly to the first frame so that the second piece and the first piece define a notch. The notch is configured for insertion of an element of a structure so that the second frame is removably attached to the structure, with the first frame being positioned above a surface from which the structure extends. The opening is configured for insertion of a bag so that an upper segment of the bag is stretchable around and attachable to the first frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
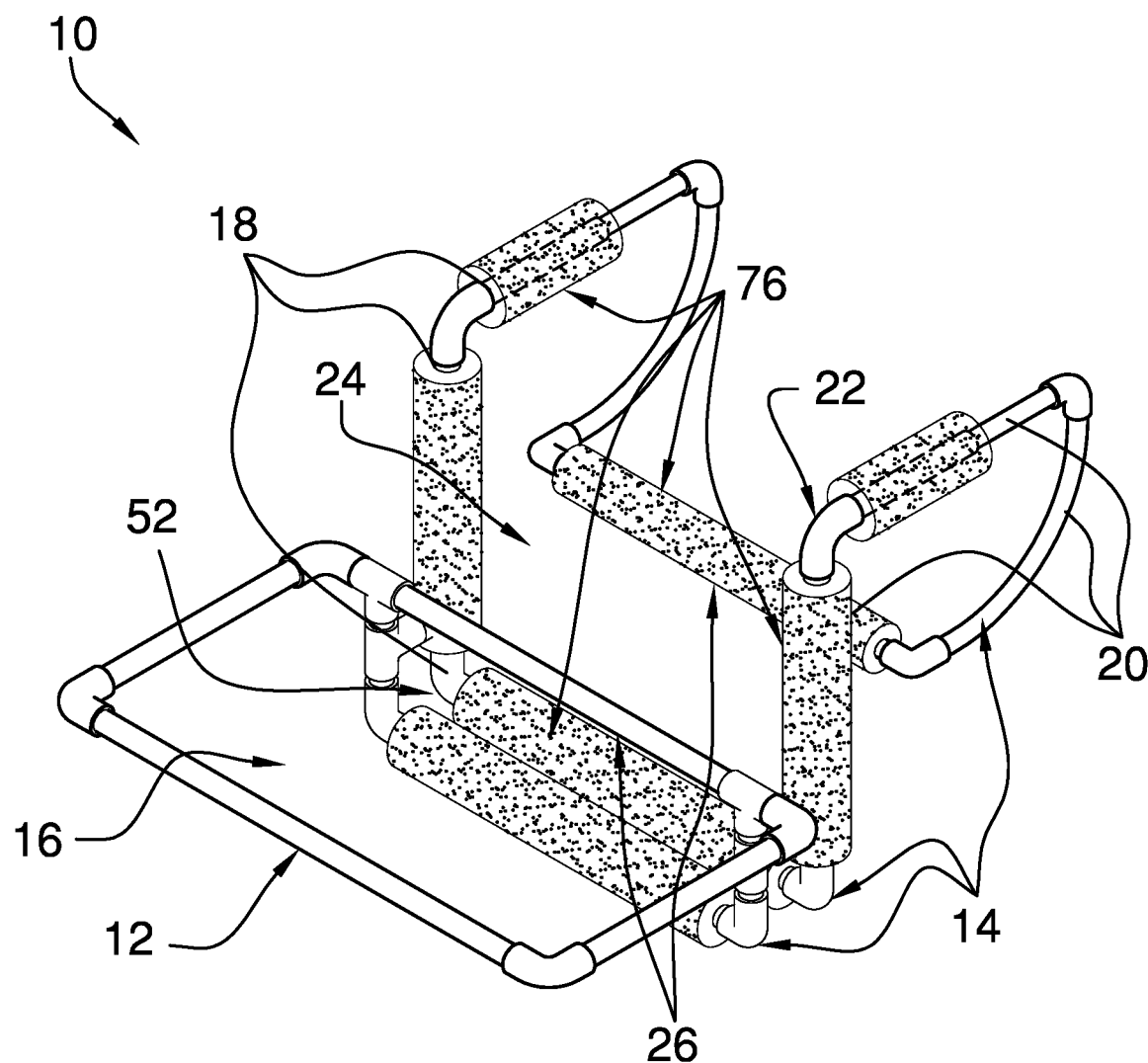
FIG. 1 is an isometric perspective view of a collapsible bag holding frame assembly according to an embodiment of the disclosure.
Figure 2:
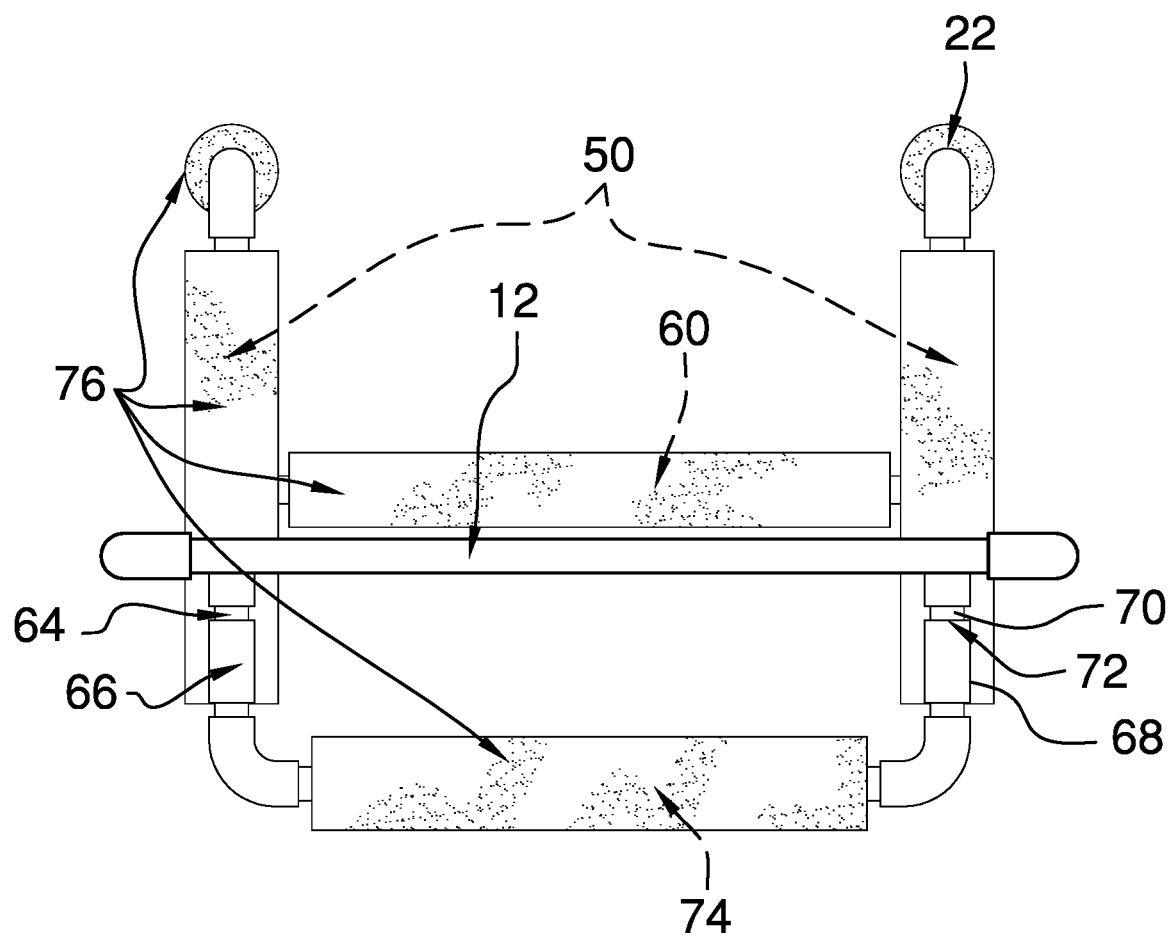
FIG. 2 is a front view of an embodiment of the disclosure.
Figure 3:
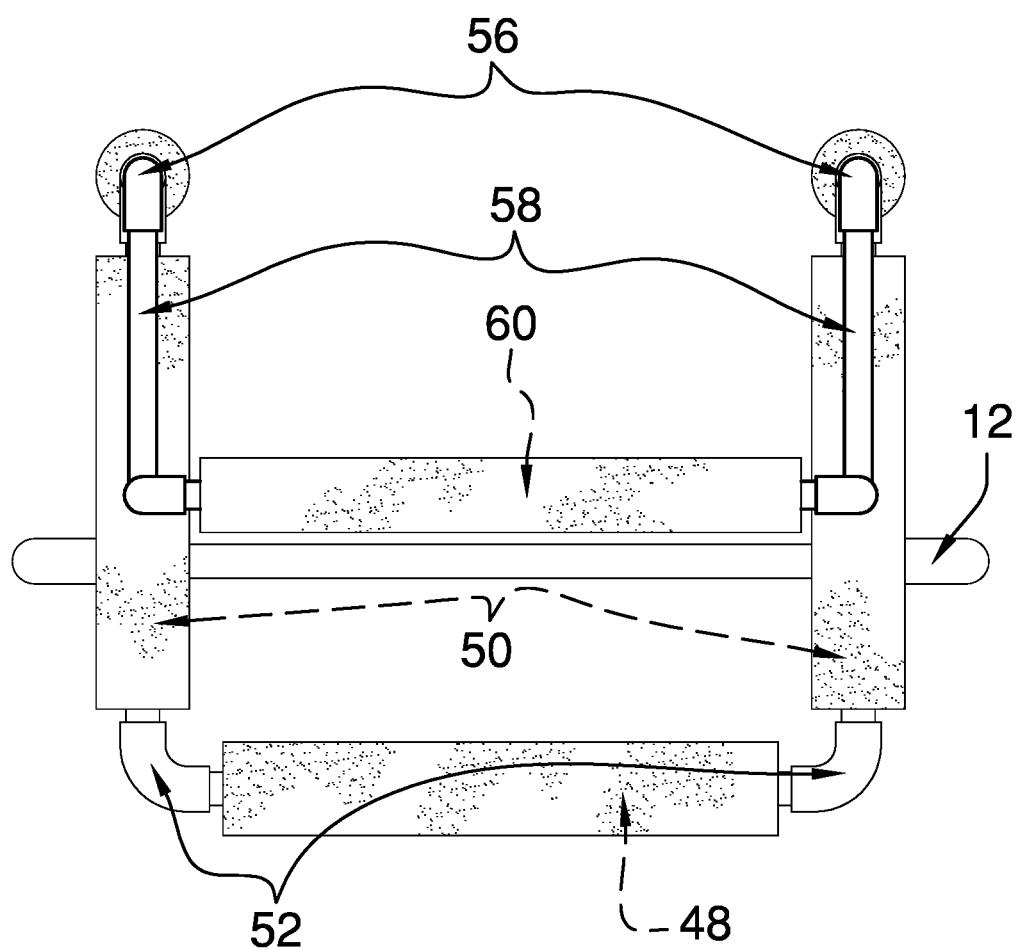
FIG. 3 is a rear view of an embodiment of the disclosure.

With reference now to the drawings, and in particular to FIGS. 1 through 7 thereof, a new holding assembly embodying the principles and concepts of an embodiment of the disclosure and generally designated by the reference numeral 10 will be described.

Figure 4:
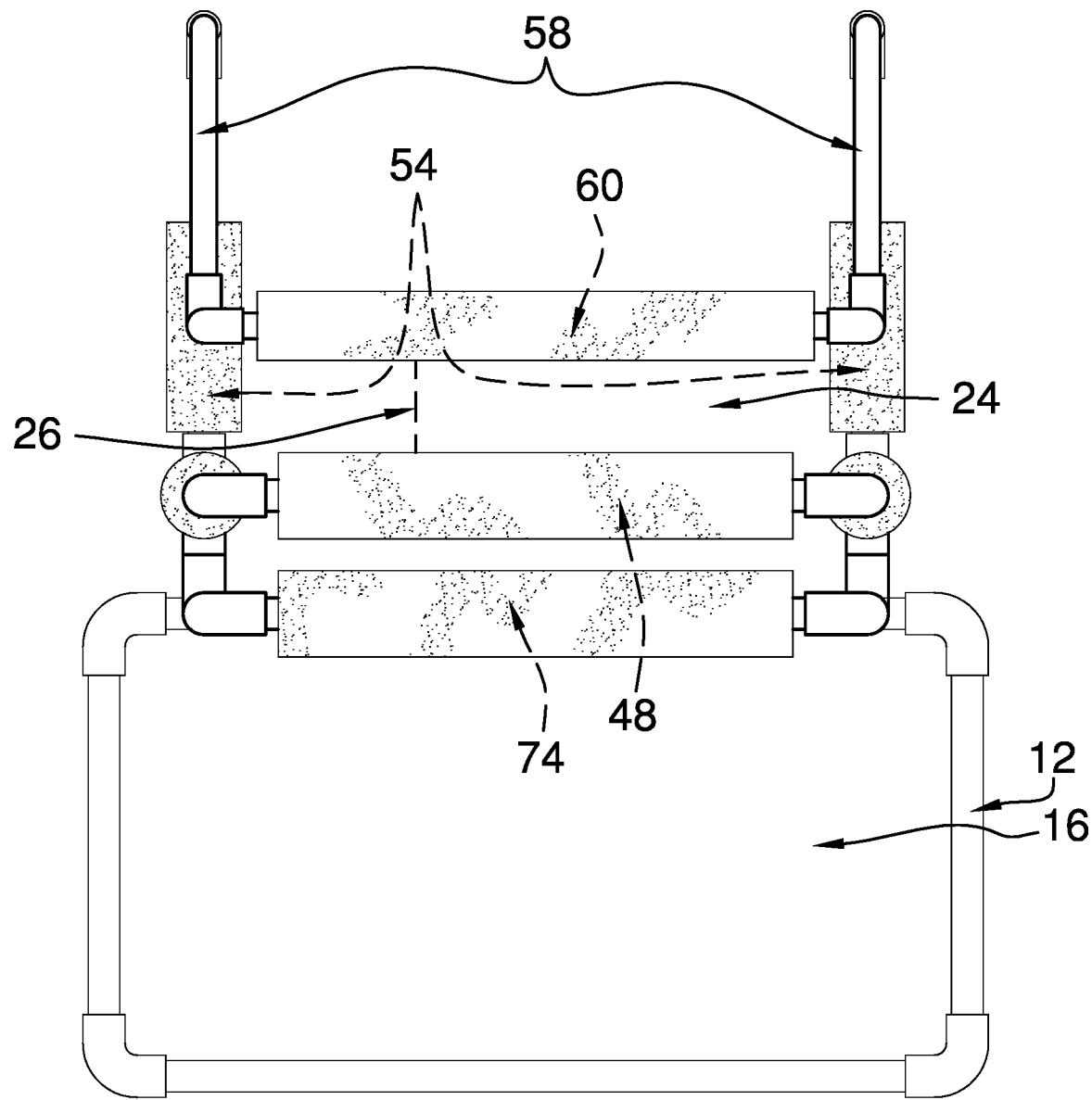
FIG. 4 is a bottom view of an embodiment of the disclosure.

As best illustrated in FIGS. 1 through 7, the collapsible bag holding frame assembly 10 generally comprises a first frame 12 and a second frame 14, which may comprise polyvinyl chloride tubing, aluminum tubing, and the like. The first frame 12 defines an opening 16, which may be rectangular, as shown in FIG. 4, circular, oval, or the like. The second frame 14 is attached to the first frame 12 so that a first piece 18 of the second frame 14 is substantially perpendicular to the first frame 12. A second piece 20 of the second frame 14 extends from proximate to an upper end 22 of the first piece 18, and opposingly to the first frame 12, so that the second piece 20 and the first piece 18 define a notch 24. The second piece 20 of the second frame 14 is slidably engaged to and selectively detachable from the first piece 18, so that a width 26 of the notch 24 is selectively adjustable, and so that the second piece 20 is separable from the first piece 18.

Figure 5:
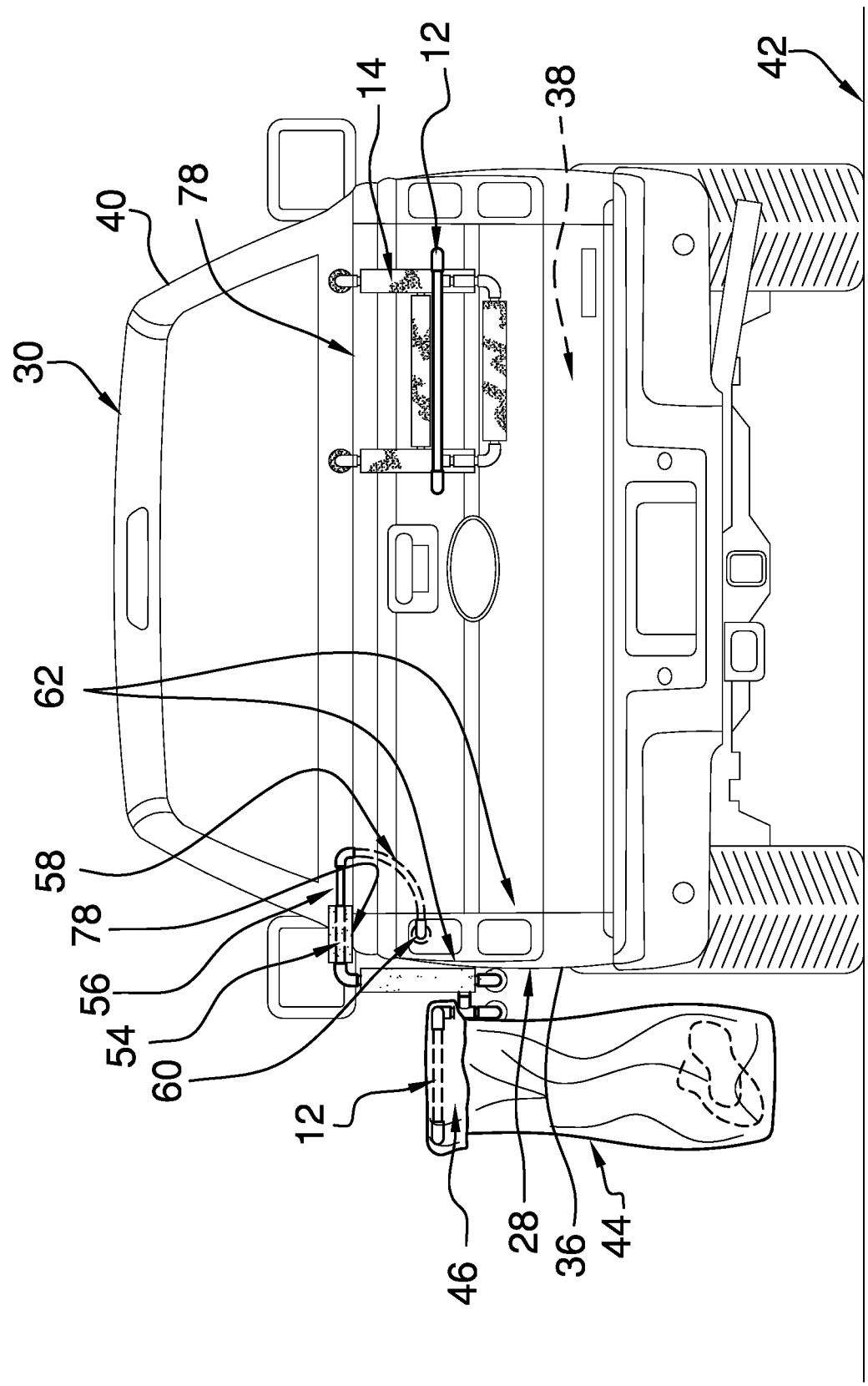
FIG. 5 is an in-use view of an embodiment of the disclosure.

The notch 24 is configured for insertion of an element 28 of a structure 30, such as, but not limited to, a door of a vehicle, a sidewall 36 of a bed 38 of a pickup truck 40, as shown in FIG. 5, a fence, a wall, and the like. The second frame 14 thus is removably attached to the structure 30, with the first frame 12 being positioned above a surface 42 from which the structure 30 extends. The opening 16 is configured for insertion of a bag 44, which can be of various types, but most typically a bag 44 for trash, so that an upper segment 46 of the bag 44 is stretchable around and attachable to the first frame 12.

The first piece 18 of the second frame 14 comprises a first pipe 48 and a pair of second pipes 50. Each second pipe 50 extends substantially perpendicularly from the first pipe 48 proximate to a respective opposed end 52 of the first pipe 48. Each of a pair of third pipes 54 extends substantially perpendicularly from a respective second pipe 50 distal from the first pipe 48. The third pipes 54 extend codirectionally from the pair of second pipes 50 and are substantially perpendicular to the first pipe 48.

Figure 6:
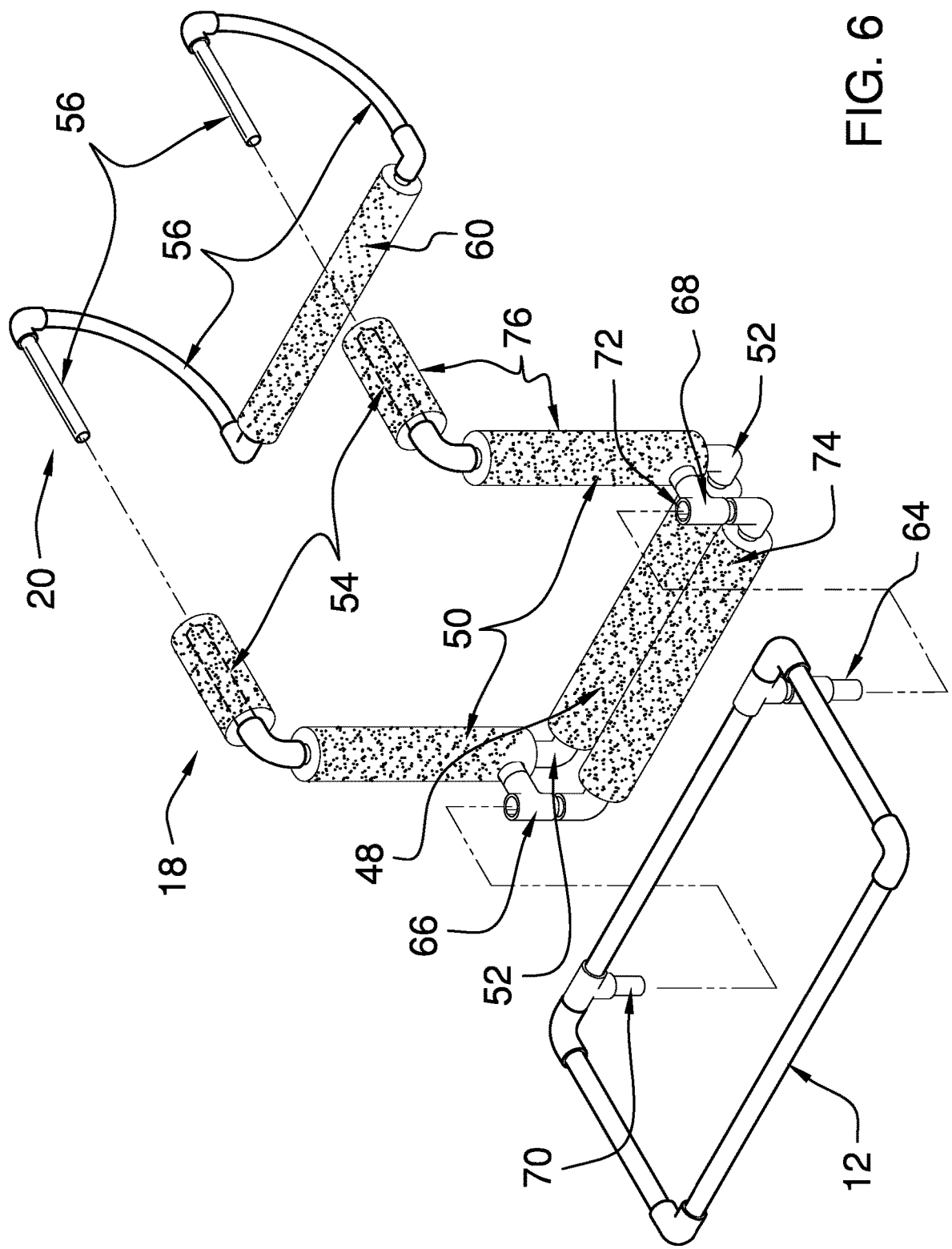
FIG. 6 is an exploded view of an embodiment of the disclosure.
Figure 7:
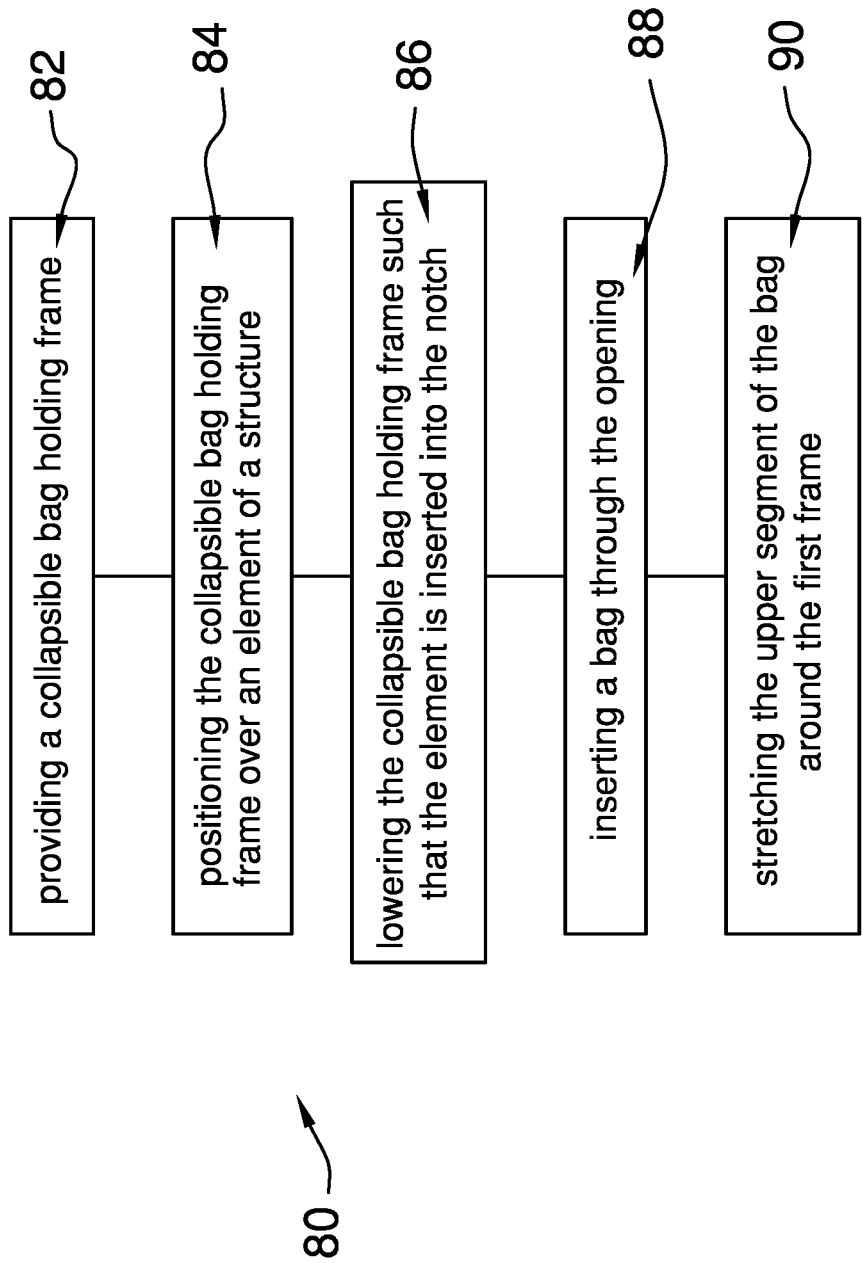
FIG. 7 is a flow diagram for a method utilizing an embodiment of the disclosure.

The second piece 20 of the second frame 14 comprises a pair fourth pipes 56, each of which is attached to and extends linearly from a respective third pipe 54. As shown in FIG. 6, the fourth pipe 56 is nested with and is slidable relative to the respective third pipe 54 to adjust the width 26 of the notch 24 and to selectively separate the second piece 20 from the first piece 18. Each of a pair of fifth pipes 58 is attached to and extends arcuately from a respective fourth pipe 56, distal from an associated third pipe 54, and toward an associate second pipe 50. A sixth pipe 60 is attached to and extends between the fifth pipes 58 distal from the fourth pipes 56. The sixth pipe 60 is positioned substantially parallel to the second pipe 50 so that the sixth pipe 60 and the pair of second pipes 50 define the notch 24. The sixth pipe 60 and the pair of second pipes 50 are configured to abut opposed faces 62 of the element 28 of the structure 30 so that the second frame 14 is removably attached to the structure 30.

A pair of first connectors 64 is attached to the first frame 12 and each of a pair of second connectors 66 is attached to a respective second pipe 50, proximate to the first pipe 48. The second connectors 66 are opposingly positioned on the second pipes 50 relative to the third pipes 54 and are complementary to the first connectors 64. Each second connector 66 is positioned to selectively connect with an associated first connector 64 to removably attach the first frame 12 to the second frame 14.

The second connector 66 may comprise a T-connector 68, as shown in FIG. 6. The associated first connector 64 comprises a pipe stub 70, which is complementary to and selectively insertable into an upper orifice 72 of the T-connector 68 so that the first frame 12 is selectively detachable from the second frame 14. As shown in FIG. 6, a cross pipe 74 is attached to and extends between the T-connectors 68. The present invention also anticipates the first frame 12 being hingedly attached to the second frame 14.

A plurality of pads 76 is attached to the second frame 14. The pads 76 are configured to protect a top face 78 and the opposed faces 62 of the element 28 of the structure 30. The pads 76 comprise foamed elastomer, silicon, rubber, or the like.

The collapsible bag holding frame assembly 10 enables a method of holding a bag 78. The method 80 comprises a first step 82 of providing a collapsible bag holding frame assembly 10 according to the specification above. A second step 84 of the method 80 is positioning the collapsible bag holding frame assembly 10 over an element 28 of a structure 30. A third step 86 of the method 80 is lowering the collapsible bag holding frame assembly 10 such that the element 28 is inserted into the notch 24. A fourth step 88 of the method 80 is inserting a bag 44 through the opening 16. A fifth step 90 of the method 80 is stretching the upper segment 46 of the bag 44 around the first frame 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible bag holding frame assembly comprising:
   a first frame defining an opening;
   a second frame attached to the first frame, such that a first piece of the second frame is substantially perpendicular to the first frame, a second piece of the second frame extending from proximate to an upper end of the first piece and opposingly to the first frame, such that the second piece and the first piece define a notch, wherein the notch is configured for insertion of an element of a structure, such that the second frame is removably attached to the structure and such that the first frame is positioned above a surface from which the structure extends, wherein the opening is configured for insertion of a bag, such that an upper segment of the bag is stretchable around and attachable to the first frame;
   wherein the first piece of the second frame comprises:
      a first pipe,
      a pair of second pipes, each second pipe extending substantially perpendicularly from the first pipe proximate to a respective opposed end of the first pipe, and
      a pair of third pipes, each third pipe extending substantially perpendicularly from a respective second pipe distal from the first pipe, such that the third pipes extend codirectionally from the pair of second pipes and substantially perpendicularly to the first pipe; and
   wherein the second piece of the second frame comprises:
      a pair fourth pipes, each fourth pipe being attached to and extending linearly from a respective third pipe,
      a pair of fifth pipes, each fifth pipe being attached to and extending arcuately from a respective fourth pipe distal from an associated third pipe and toward an associate second pipe, and a sixth pipe attached to and extending between the fifth pipes distal from the fourth pipes, such that the sixth pipe is positioned substantially parallel to the first pipe, such that the sixth pipe and the pair of second pipes define the notch, wherein the sixth pipe and the pair of second pipes are configured for abutting opposed faces of the element of the structure, such that the second frame is removably attached to the structure.

2. The collapsible bag holding frame assembly of claim 1, wherein the opening is rectangular.

3. The collapsible bag holding frame assembly of claim 1, wherein the second piece is slidably engaged to and selectively detachable from the first piece, such that a width of the notch is selectively adjustable and such that the second piece is separable from the first piece.

4. The collapsible bag holding frame assembly of claim 1, further including:
    a pair of first connectors attached to the first frame; and
    a pair of second connectors, each second connector being attached to a respective second pipe proximate to the first pipe, such that the second connectors are opposingly positioned on the second pipes relative to the third pipes, the second connectors being complementary to the first connectors, such that each second connector is positioned for selectively connecting with an associated first connector for removably attaching the first frame to the second frame.

5. The collapsible bag holding frame assembly of claim 4, wherein:
    the second connector comprises a T-connector; and
    the associated first connector comprises a pipe stub complementary to and selectively insertable into an upper orifice of the T-connector, such that the first frame is selectively detachable from the second frame.

6. The collapsible bag holding frame assembly of claim 5, further including a cross pipe attached to and extending between the T-connectors.

7. The collapsible bag holding frame assembly of claim 1, wherein the fourth pipe is nested with and slidable relative to the respective third pipe for adjusting the width of the notch and selectively separating the second piece from the first piece.

8. The collapsible bag holding frame assembly of claim 1, further including a plurality of pads attached to the second frame, wherein the pads are configured for protecting a top face and opposed faces of the element of the structure.

9. The collapsible bag holding frame assembly of claim 8, wherein the pads comprise foamed elastomer.

10. A collapsible bag holding frame assembly comprising
    a first frame defining an opening, the opening being rectangular,
    a pair of first connectors attached to the first frame;
    a second frame attached to the first frame, such that a first piece of the second frame is substantially perpendicular to the first frame, a second piece of the second frame extending from proximate to an upper end of the first piece and opposingly to the first frame, such that the second piece and the first piece define a notch, wherein the notch is configured for insertion of an element of a structure, such that the second frame is removably attached to the structure and such that the first frame is positioned abed e a surface from which the structure extends, wherein the opening is configured for insertion of a bag, such that an upper segment of the bag is stretchable around and attachable to the first frame, the second piece being slidably engaged to and selectively detachable from the first piece, such that a width of the notch is selectively adjustable and such that the second piece is separable from the first piece;
    the first piece of the second frame comprising:
        a first pipe, a pair of second pipes, each second pipe extending substantially perpendicularly from the first pipe proximate to a respective opposed end of the first pipe,
        a pair of third pipes, each third pipe extending substantially perpendicularly from a respective second pipe distal from the first pipe, such that the third pipes extend codirectionally from the pair of second pipes and substantially perpendicularly to the first pipe,
        a pair of second connectors, each second connector being attached to a respective second pipe proximate to the first pipe, such that the second connectors are opposingly positioned on the second pipes relative to the third pipes, the second connectors being complementary to the first connectors, such that each second connector is positioned for selectively connecting with an associated first connector for removably attaching the first frame to the second frame, the second connector comprising a T-connector, the associated first connector comprising a pipe stub complementary to and selectively insertable into an upper orifice of the T-connector, such that the first frame is selectively detachable from the second frame, and
        a cross pipe attached to and extending between the T-connectors;
    the second piece of the second frame comprising:
        a pair fourth pipes, each fourth pipe being attached to and extending linearly from a respective third pipe, the fourth pipe being nested with and slidable relative to the respective third pipe for adjusting the width of the notch and selectively separating the second piece from the first piece,
        a pair of fifth pipes, each fifth pipe being attached to and extending arcuately from a respective fourth pipe distal from an associated third pipe and toward an associate second pipe, and
        a sixth pipe attached to and extending between the fifth pipes distal from the fourth pipes, such that the sixth pipe is positioned substantially parallel to the first pipe, such that the sixth pipe and the pair of second pipes define the notch, wherein the sixth pipe and the pair of second pipes are configured for abutting opposed faces of the element of the structure, such that the second frame is removably attached to the structure; and
    a plurality of pads attached to the second frame, wherein the pads are configured for protecting a top face and the opposed faces of the element of the structure, the pads comprising foamed elastomer.

* * * * *